United States Patent [19]
Lee et al.

[11] Patent Number: 5,589,071
[45] Date of Patent: Dec. 31, 1996

[54] ANION-EXCHANGE MEMBRANE EXTRACTOR FOR BORIC ACID SEPARATION

[75] Inventors: Kun-Jai Lee, Taejon; Jong-Kil Park, Anyang, both of Rep. of Korea

[73] Assignee: Korea Advanced Institute of Science and Technology, Taejon, Rep. of Korea

[21] Appl. No.: 502,758

[22] Filed: Jul. 14, 1995

[30] Foreign Application Priority Data

Jan. 25, 1995 [KR] Rep. of Korea .................. 95-1320

[51] Int. Cl.$^6$ .................................................. B01D 15/04
[52] U.S. Cl. .................... 210/638; 210/644; 210/321.75; 210/321.84; 423/157; 423/2
[58] Field of Search ............................ 210/638, 321.75, 210/321.84, 321.72, 261, 644; 423/157, 2; 204/182.4

[56] References Cited

U.S. PATENT DOCUMENTS

| | | | |
|---|---|---|---|
| 4,148,708 | 4/1979 | Grant .................... | 210/182.4 |
| 4,663,002 | 5/1987 | Chiang .................... | 204/182.4 |
| 4,675,090 | 6/1987 | Dagard et al. ............ | 204/182.4 |
| 4,755,298 | 7/1988 | Grinstead ................. | 210/638 |
| 4,891,137 | 1/1990 | Nohl et al. ............... | 210/644 |
| 4,925,541 | 5/1990 | Giuffrida et al. .......... | 204/182.4 |
| 4,983,302 | 1/1991 | Bálint et al. ............. | 210/638 |
| 4,997,569 | 5/1991 | Silkak .................... | 210/638 |
| 5,082,549 | 1/1992 | Voss et al. ............... | 204/182.4 |
| 5,154,809 | 10/1992 | Oren et al. ............... | 204/182.4 |
| 5,482,632 | 1/1996 | Lomasney et al. .......... | 210/638 |

OTHER PUBLICATIONS

*Diffusion Coeffieients for Aqueous Boric Acid*, Park et al., J. Chem. Eng. Data, 39:891–894 (10994).

*Novel Liquid–in–Pore Configurations in Membrane Solvent Extraction*, Prasad et al., AIChE J., 36(10):1592–1596 (1990).

*Dispersion–Free Solvent Extraction with Microporous Hollow–Fiber Modules*, Prasad et al., AIChE J., 34(2):177–188 (1988).

*Nondispersive Solvent Extraction Using Microporous Membranes*, Prasad et al., Memb. Mat. Proc. in AIChE Symposium Series, 84(261):42–53 (1988).

*Microporous Membrane Solvent Extraction*, Prasad et al., Separ. Sci. Technol., 22(2&#):619–640 (1987).

*Solvent Extracton with Immobilized interfaces in a Micorporous Hydrophobic Membrane*, Kiani et al., J. Memb. Sci., 20:125–145 (1984).

*Primary Examiner*—Ana Fortuna
*Attorney, Agent, or Firm*—Darby & Darby, P.C.

[57] ABSTRACT

The present invention relates to an anion-exchange membrane extractor for boric acid separation, which is capable of separating boric acid from the radioactive liquid waste concentrated by evaporation of the radioactive liquid waste produced in the pressurized light water reactor and a method of separating boric acid from the radioactive liquid waste employing the extractor. The onion-exchange membrane extractor for boric acid separation which comprises: an upper cell being equipped with an inlet, an outlet, and fluid-injecting holes; a concentrate cell, an extract cell and a lower cell, each of which is equipped with an inlet, an outlet, fluid-injecting holes, and a supporting shelf on the upper layer; a. water-proofing means for preventing leaking-out of the concentrate and the extract, being inserted into the interface between the said cells; a transporting tube being connected to the inlets and outlets of the said cells for the transfer of the concentrate and the extract between the cells; a supporting screen being held up on the supporting shelf positioned in each of the said cells, holding up the onion-exchange membrane; and, an onion-exchange membrane being supported by the said supporting screen to extract boric acid.

2 Claims, 6 Drawing Sheets

ANION-EXCHANGE MEMBRANE EXTRACTOR FOR BORIC ACID SEPARATION

FIELD OF THE INVENTION

The present invention relates to an anion-exchange membrane extractor for boric acid separation and a method of separating boric acid from the radioactive liquid waste employing the extractor, more specifically, to an anion-exchange membrane extractor for boric acid separation, which is capable of separating boric acid from the radioactive liquid waste concentrated by evaporation of the radioactive liquid waste produced in the pressurized light water reactor, and a method of separating boric acid from the radioactive liquid waste employing the extractor.

BACKGROUND OF THE INVENTION

The radioactive liquid waste produced in the pressurized light water reactor has been treated in an evaporator or an ion-exchange resin bed. The evaporation method employing an evaporator, where the liquid waste is concentrated to reduce the amount of the waste, has advantages that: the distilled water can be recycled and the outflow of the radioactive material to the environment can be minimized.

The evaporation method, however, has been known to cause various difficult problems due to boric acid contained in the liquid waste. For example, since highly concentrated boric acid precipitates impair the evaporator, the maximum concentration of boric acid has to be maintained within 12 wt % of the liquid waste, which has been one of obstructive factors in reducing the volume of the liquid waste. In addition, the method essentially requires extra energy since the concentrated liquid waste is stored in the concentrate tank at an insulating temperature of 70° C., and boric acid prolongs and interferes with curing of the cement, and the borated free water which remains unbound to the cement, corrodes the steel drums, which also plays an obstructive role in safe disposal, storage and treatment of the drums containing the waste.

Under the circumstances, a variety of methods by which boric acid can be separated from the liquid waste, and then recycled or put into disposal, have been developed in the art, e.g., solvent extraction, precipitation, ion-exchange, and membrane separation.

The solvent extraction method by which boric acid is extracted with solvents such as 2-ethylhexanediol-1,3 (EHD), 2,2-ethylbutylpropanediol (EBPD) or an organic solvent mixture of 25% (v/v) of isooxanol and 75% (v/v) of xylene containing 0.4M EBPD, has been commonly used in the art; however, it has shortcomings of a complex installation, an intricate and expensive operation, and an uneasy treatment of by-products.

The precipitation method, which is categorized into two methods, i.e., a method by which every positively charged materials except boric acid are precipitated and another method by which only boric acid is precipitated, has been known to have an advantage of a simple modification of the system. However, the method also has serious difficulties that: a large quantity of precipitant is required in the treatment; and, control of the radioactive precipitate accompanied by frequent co-precipitation is very inefficient.

The ion-exchange method, which comprises the steps of removing anions contained in the waste and collecting boric acid through a recycling operation after adsorbing boric acid to the resin, has a merit that the operation and modification of the system are very simple and easy. However, the method also has shortcomings that: the efficiency of the resin is changeable depended on the chemical properties of the waste; and, the treatment of contaminated resin is very difficult.

The membrane extraction method employing the reverse osmosis and the electrodialysis techniques has a merit that the extracted boric acid can be recycled without any further treatment. However, the reverse osmosis technique costs high for maintenance and repair, since it operates under a high pressure; and, the electrodialysis technique has a difficulty in installation of the equipment and also produces inflammable gases.

Accordingly, the prior art methods for boric acid separation have been proven to have various difficult problems and limitations for their practical and industrial application.

SUMMARY OF THE INVENTION

In accordance with the present invention, it has been discovered that boric acid can be separated from the radioactive liquid waste in an effective and simple manner, by employing a novel anion-exchange membrane extractor of the invention.

A primary object of the present invention is, therefore, to provide an anion-exchange membrane extractor for effective and simple separation of boric acid from the radioactive liquid waste.

Another object of the invention is to provide a method of separating boric acid from the radioactive liquid waste concentrate employing the anion-exchange membrane extractor.

BRIEF DESCRIPTION OF THE DRAWINGS

The above and the other objects and features of the present invention will become apparent from the following descriptions given in conjunction with the accompanying drawings, in which.

DETAILED DESCRIPTION OF THE INVENTION

The anion-exchange membrane extractor for boric acid separation of the present invention comprises:

an upper cell being equipped with an inlet, an outlet, and fluid-injecting holes;

a concentrate cell, an extract cell and a lower cell, each of which is equipped with an inlet, an outlet, fluid-injecting holes, and a supporting shelf on the upper layer;

a water-proofing means for preventing leaking-out of the concentrate and the extract, being inserted into the interface between the said cells;

a transporting tube being connected to the inlets and outlets of the said cells for the transfer of the concentrate and the extract between the cells;

a supporting screen being held up on the supporting shelf positioned in each of the said cells and holding up the anion-exchange membrane; and, an anion-exchange membrane being supported by the said supporting screen to extract boric acid.

Preferred embodiment of the anion-exchange membrane extractor of the present invention is explained in details with reference of accompanying drawings, which should not be taken to limit the scope of the present invention.

The anion-exchange membrane extractor of the invention is designed and made, under careful consideration of the variables that affect the operation of the extractor. In this regard, the differential diffusion coefficient and the mass transfer coefficient of boric acid in the anion-exchange membrane are primarily considered as variables. The differential diffusion coefficient was measured by the aid of a Stokes diaphragm cell (see: J.K. Park et al., J. Chem. Eng. Data, 39:891–894 (1994)); and, the mass transfer coefficient was measured with the AFN anion-exchange membrane (Tokuyama Soda Co., Ltd, Japan) equipped in the apparatus shown in FIG. 1.

Figure 1:
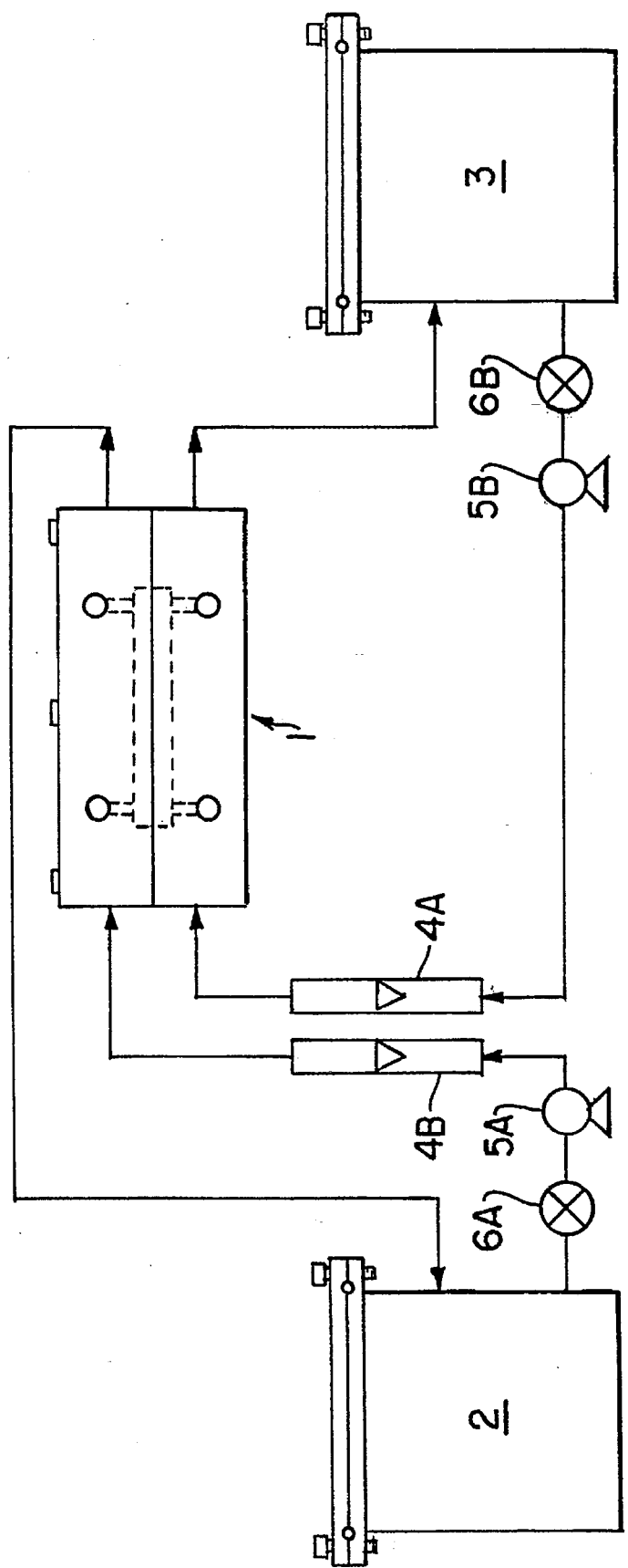
FIG. 1 is a schematic diagram of the apparatus for boric acid separation and measurement of the mass transfer coefficient.

The mass transfer coefficient of boric acid was measured, by employing the apparatus shown in FIG. 1 operating in an once-through mode under a temperature of 55° C. The solution containing boric acid and cobalt was poured into the concentrate reservoir (3), and distilled water of which electrical conductivity is approximately $10^{-6}$ mho/cm was poured into the diluent reservoir (2), respectively. The materials contained in the concentrate reservoir (3) and the diluent reservoir (2) were transferred to the extractor (1) by the aid of the pump (5A,5B), the flow rates of which were controlled by flow control valve (6A,6B) and were measured by a flow meter (4A,4B). The mass transfer coefficient of boric acid in the anion-exchange membrane was measured with three kinds of boric acid solutions (pH 7.0) of near 2.0M containing $5.0 \times 10^{-4}$M cobalt, and the mean value thereof was taken. The boric acid was separated in a recirculation mode using the apparatus of FIG. 1 under a temperature of 40° C. and a flow rate of 400 cm$^3$/min. To the concentrate reservoir (3) and the extract reservoir (2) were added the same solutions as in the measurement of the mass transfer coefficient and separation was initiated with boric acid of approximately 2.0M. Once the concentrate and the extract flow into the extractor, boric acid, by the action of the anion-exchange membrane located in the space between the upper and lower parts of the extractor, is separated into the extract from the concentrate, where the concentrate and the extract flow along the groove present on the upper and lower parts of the extractor.

Figure 2:
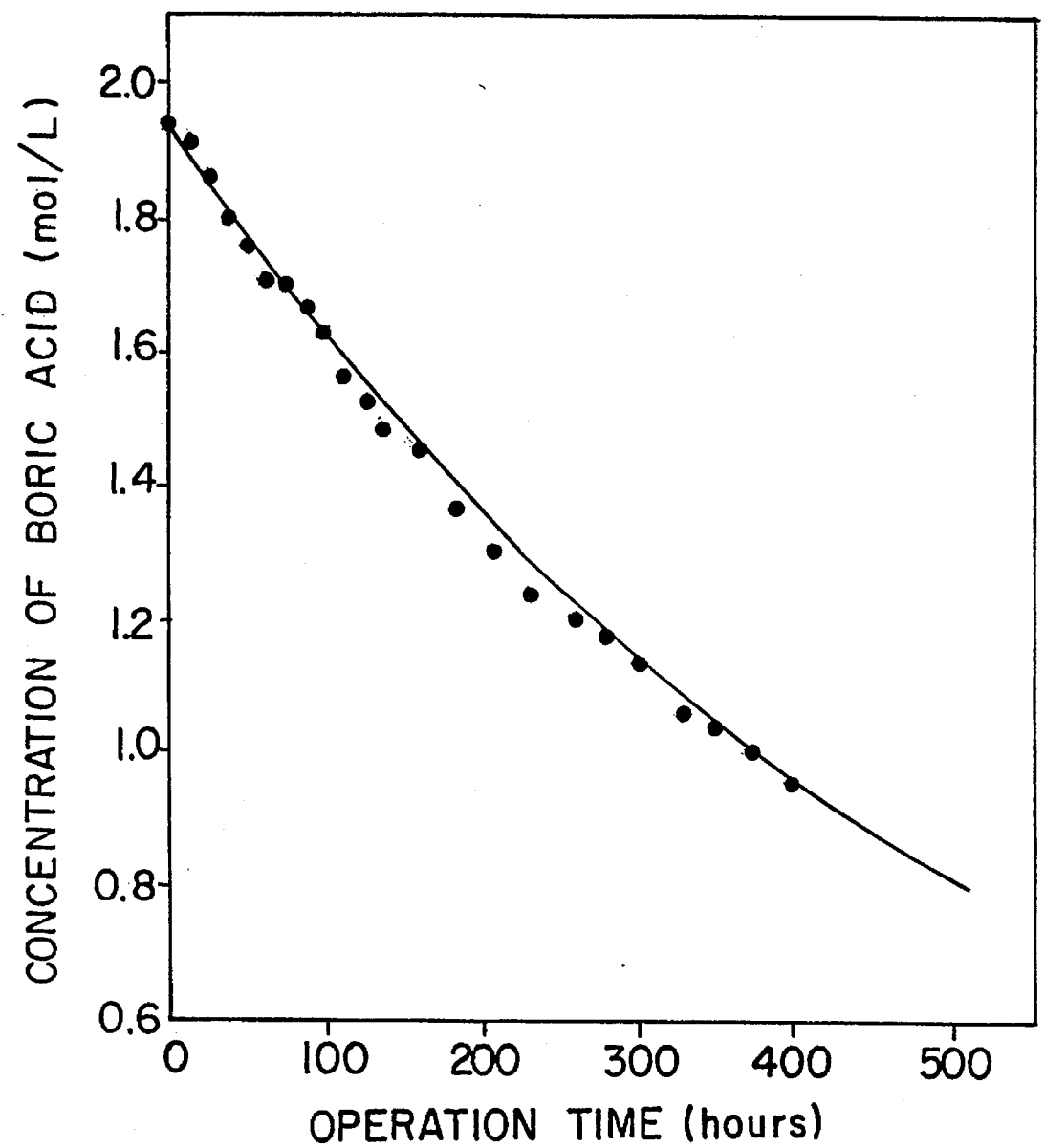
FIG. 2 is a graph showing a result of boric acid separation at a temperature of 40° C. employing the apparatus of FIG. 1.
Figure 3:
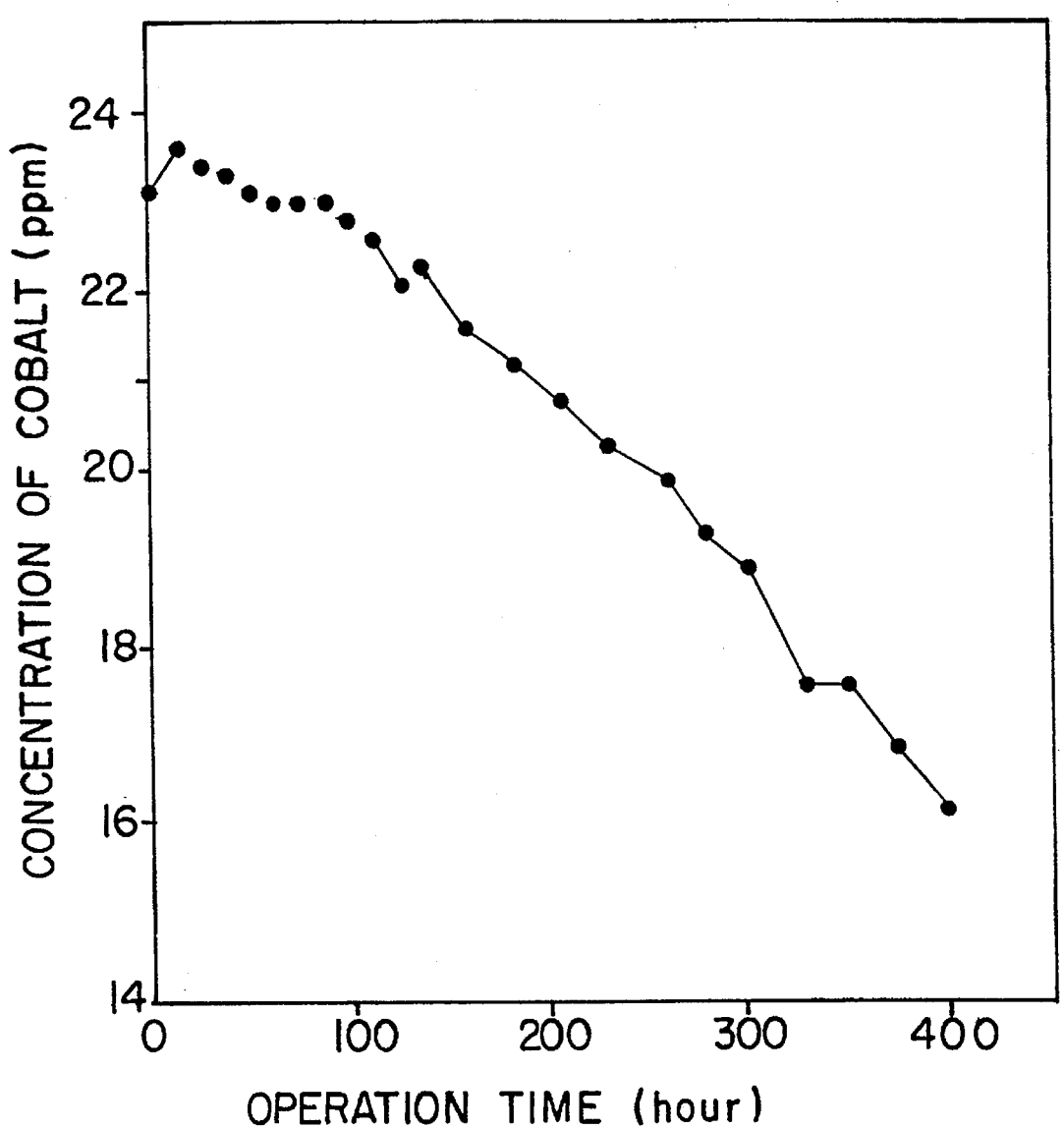
FIG. 3 is a graph showing the concentration change of cobalt at a temperature of 40° C. employing the apparatus of FIG. 1.

FIGS. 2 and 3 show the results of boric acid separation and simulation curve (–) thereof and the cobalt concentration change of cobalt, during operation of the apparatus of FIG. 1 at a temperature of 40° C. The closed circles (●) of FIGS. 2 and 3 represent the results of direct measurement of the concentration changes of boric acid and cobalt in the concentrate reservoir (3), respectively. As shown in FIGS. 2 and 3, the concentration of boric acid was reduced almost steadily during operation, whereas that of cobalt remained almost same during 100 hours after initiation of the operation and was then reduced gradually after 100 hours. From the results of FIGS. 2 and 3, it is concluded that: if the surface area of the anion-exchange membrane is enlarged and the extractor is terminated within 100 hours after initiation, boric acid can be separated in an isolated form not contaminated with cobalt in the concentrate; and, if the extractor of an appropriate size is applied to the boric acid separation from the radioactive waste concentrate produced at the nuclear power plants, boric acid can be separated in an effective manner, without contamination of the monitor tank with the radioactive cations.

Figure 4:
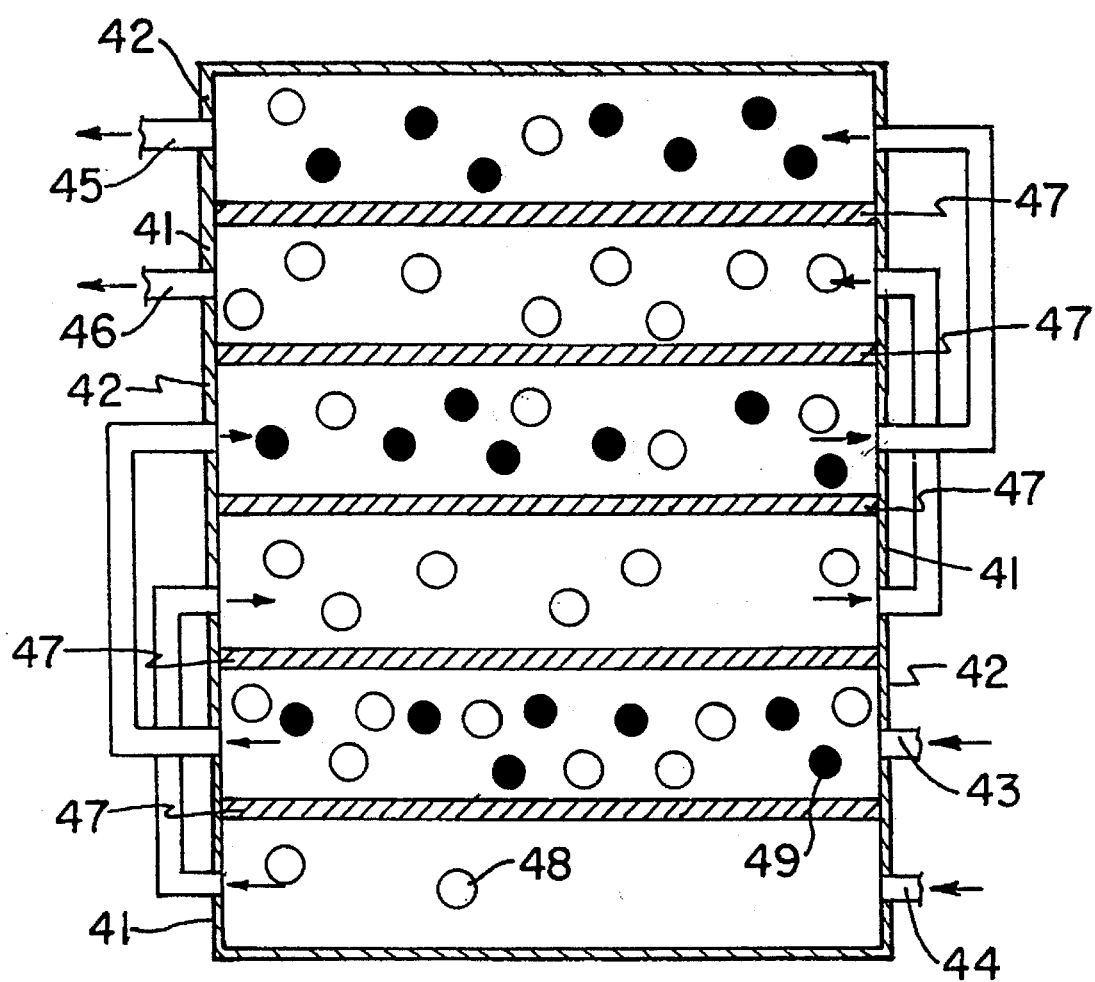
FIG. 4 is a schematic diagram showing a structure of an anion-exchange membrane extractor for boric acid separation of the invention.

Referring to FIG. 4, a structure of the extractor of the invention equipped with a number of cells to increase the surface area of the anion-exchange membrane is shown, where distilled water contained in the monitor tank and the concentrate in the evaporator are employed for the extract and the concentrate, respectively. The concentrate in the evaporator flows into the concentrate cell (42) through the concentrate inlet (43) and the extract in the monitor tank flows into the extract cell (41) through the extract inlet (44). As the concentrate and the extract flow through the cells, radioactive cations (49) such as Cs and Co contained in the concentrate remain within the concentrate, due to a repulsion of the anion-exchange membrane (47), while borate ions (48) contained in the concentrate gradually flow into the extract. On the other hand, the concentrate and the extract leave the cells through their outlets (45,46), then enter the evaporator and the monitor tank, respectively.

Figure 5:
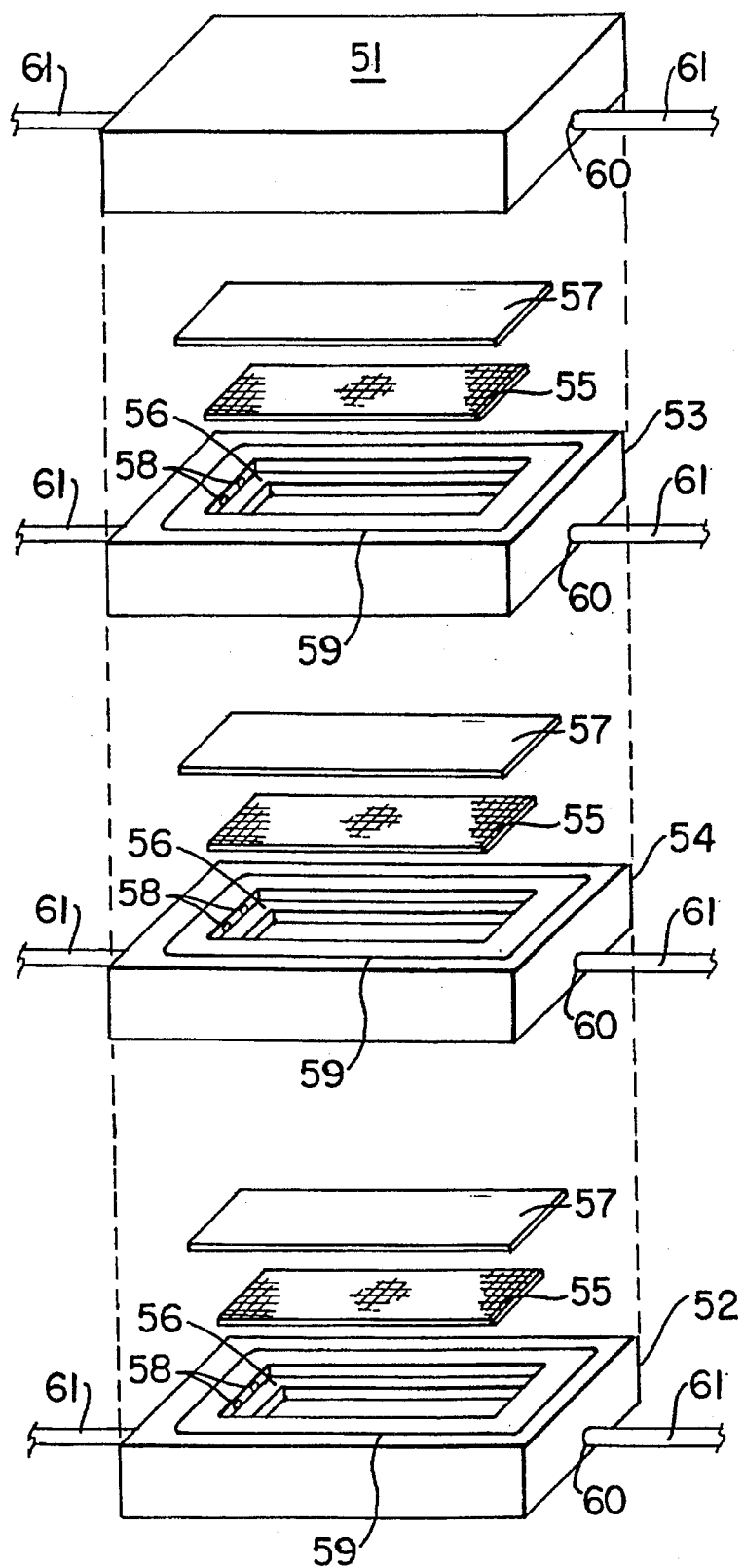
FIG. 5 is a detailed diagram showing the anion-exchange membrane extractor of the invention; and, FIG. 6 is a graph showing the efficiency of boric acid separation employing the anion-exchange membrane extractor of the invention.

Referring to FIG. 5, a detailed diagram showing the anion-exchange membrane of the invention which is designed to be employed in the extractor of FIG. 4 is provided. As a preferred embodiment of the extractor, the upper cell (51), the lower cell (52), the concentrate cell (53), and the extract cell (54) of the extractor are made of stainless steels and the concentrate cell (53) and the extract cell (54) are bound together by the aid of proper means for fastening, e.g., bolt-nut junction, and coupled as a unit so that the number of the concentrate (53)-extract (54) unit can be regulated in an appropriate manner, in a relation to the amount or concentration of the liquid concentrate separated. The inlet and outlet (60) are preferably installed at the grooves of the upper cell (51) and lower cell (52); and, the fluid-injecting holes (58) to distribute the fluid uniformly throughout the cell are located on the wall of the groove, whose number is appropriately regulated to meet the purpose of the separation.

Similar grooves to those of the upper cell (51) and lower cell (52) are positioned in the concentrate cell (53) and extract cell (54), respectively. The grooves are preferably made of stainless steels or plastics; and, the cells are scooped out of every parts except for the supporting shelf (56) which supports the ion-exchange membrane and the supporting screen (55). In turn, the supporting screen (55) is put on the supporting shelf (56) of the cells and fastened to the cells, thus preventing the anion-exchange membrane (57) from being modified or broken down due to high fluid pressure. O-ring (59) is inserted into the interface where two cells are bound together for the purpose of water-proofing. The concentrate and the extract being passed through the cells are transported to the next cells through the connecting tube (61) connected to the inlet and outlet (60).

The operation mode of the anion-exchange membrane extractor of the invention is described in more detail with references on the accompanying drawings.

Figure 6:
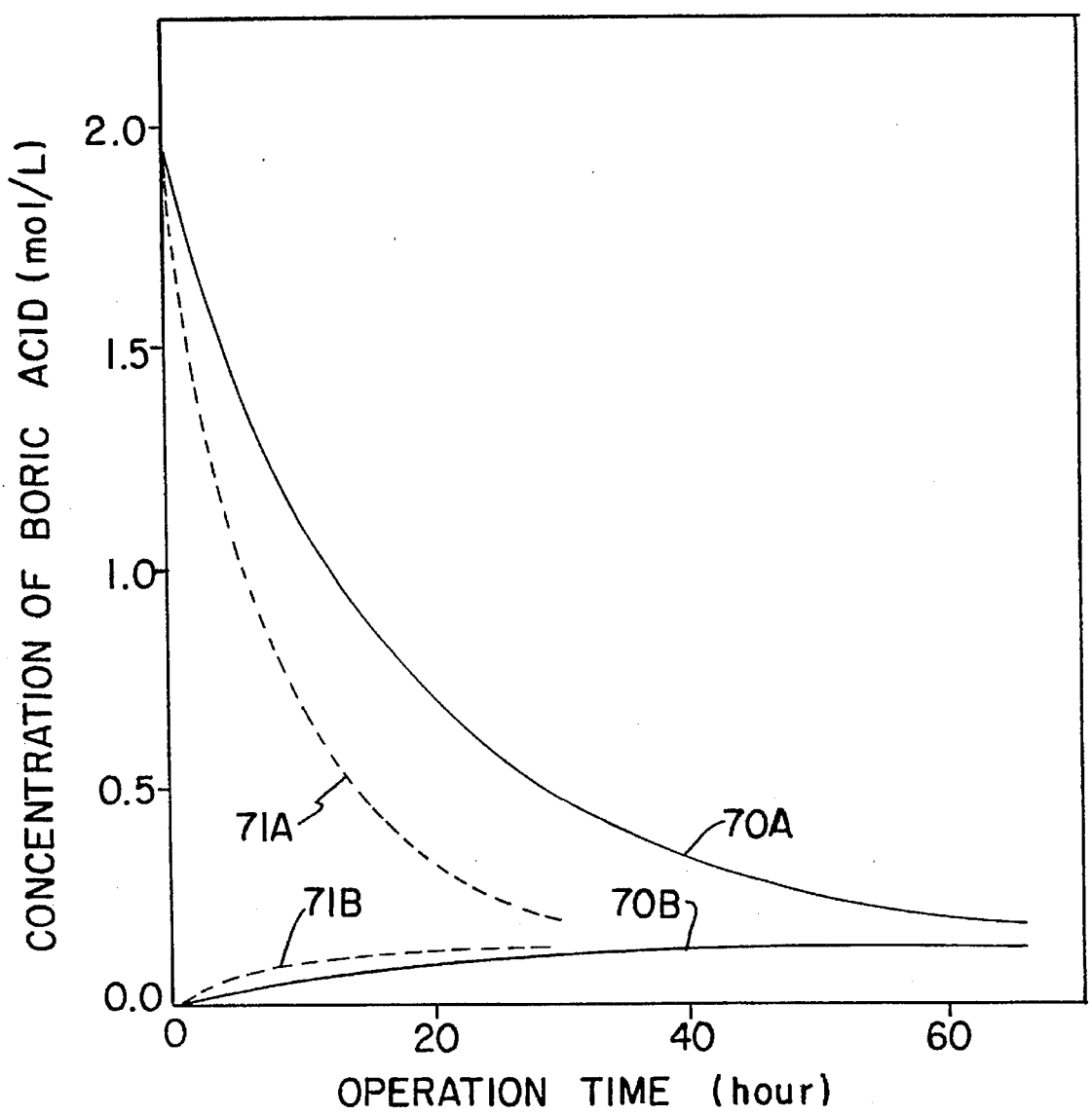

In order to determine the efficiency of boric acid separation using the anion-exchange membrane extractor of the invention, two extractors, each of which is of 1 m length, 1 m width, and 0.5 m height, and consists of 40 cells, respectively, were connected in a serial manner. On the assumption that: the total surface area of the ion-exchange membrane contacting the concentrate and the extract is 40 m², the capacity of the evaporator (a source of the concentrate) is $9.0 \times 10^3$ L, the capacity of the monitor tank (a source of the extract) is $9.0 \times 10^3$ L, the flow rate is 76 L/min (approximately 20 gpm), and the length and diameter of the tube connecting between the extractor and each of the liquid source are 50 m and 5.08 cm, respectively, the efficiency of the extractor (in boric acid separation) was determined employing a computer program in the art and represented as a graph of FIG. 6. 70A and 70B, and 71A and 71B of FIG. 6 indicate the concentration changes of boric acid in the evaporator and the monitor tank, when the extractor operates at 40° C. (–) and 25° C. (—), respectively. As postulated from the results of FIG. 6, it was determined that: more than 90% of the boric acid content in the evaporator can be separated in 100 hours, if the anion-exchange membrane extractor of the invention is used.

Further, in order to analyze the efficiency of volume reduction of the anion-exchange membrane extractor, the following data obtained from the pressurized light water reactor operation were employed:

(i) mean value of boric acid concentration in the liquid waste of pressurized light water reactor=250 ppm (ii) mean value of concentration of the dissolved ions except borate ion=40 ppm (iii) annual production of liquid waste=$4.0 \times 10^6$ L (iv) an input of the concentrate waste per drum (210 L)=90 L On the assumptions described above, the efficiencies of volume reduction under the following two cases were evaluated:

(i) in the case of employing the extractor of the invention, after the liquid waste was concentrated by evaporator until the boric acid content reached 12 wt %, then 90% of boric acid was removed by the membrane extractor and the liquid waste was reconcentrated up to 25 wt % as a total dissolved solid; and, (ii) in the case of unemploying the extractor, the liquid waste was concentrated in the evaporator until the boric acid concentration was increased to 12 wt %.

The final amounts of the concentrated liquid waste produced in the said two cases were calculated to be $1.04 \times 10^3$ L (approx. 12 drums) and $8.3 \times 10^3$ L (approx. 93 drums), respectively. Accordingly, it was concluded that: the anion-exchange membrane extractor cuts down the amount of the liquid waste produced up to over 87%; the extractor improves the stability of the solidified cement matrix; and, the extractor also leaves less than 45 drums of the waste, the amount that is produced in the prior art ion-exchange method employing only an ion-exchange resin bed without evaporator.

As clearly demonstrated and illustrated above, the present invention provides an anion-exchange membrane extractor for boric acid separation whose structure is so simple that maintenance and operation cost thereof can be remarkably reduced, while the production of by-products can be minimized. According to the treatment method of the radioactive liquid waste employing the anion-exchange membrane extractor of the invention, it reduces the amount of the concentrate produced, improves the stability of the solidified cement matrix for the liquid waste, and guarantees a safe disposal, storage and treatment of the waste.

What is claimed is:

1. An anion-exchange membrane extractor for boric acid separation from a liquid waste, which comprises:

an upper cell being equipped with an inlet, an outlet;

a concentrate cell and extract cell, and a lower cell arranged in stacked configuration, each of which has an upper layer, and each of which is equipped with an inlet, an outlet, fluid-injecting holes, and a supporting shelf on the upper layer;

a water-proofing means for preventing leaking-out for the concentrate and the extract, being inserted into the interface between said cells;

a transporting tube being connected to the inlets and outlets of said cells for the transfer of the concentrate and the extract between the cells;

a supporting screen being held up on the supporting shelf positioned in each of said cells;

an anion-exchange membrane being supported by said supporting screen to extract boric acid;

wherein said extractor does not require the application of an electric potential across said membrane for its function, and wherein said extract cell is adapted to receive and extract solution.

2. A method of separating boric acid from a concentrate of radioactive liquid waste contained in an evaporator which comprises the steps of:

passing the concentrate through a concentrate cell of an anion-exchange membrane extractor while an extract contained in a monitor tank is passed through an extract cell of the extractor;

allowing borate ions contained in the concentrate to flow into the extract; and, allowing the concentrate and the extract to leave the concentrate cell and the extract cell and to enter the evaporator and the tank, respectively, wherein the anion-exchange membrane extractor comprises:

an upper cell equipped with an inlet, an outlet;

a concentrate cell, an extract cell, and a lower cell, each of which has an upper layer and each of which is equipped with an inlet, an outlet, fluid-injecting holes, and a supporting shelf on the upper layer;

a water-proofing means inserted into the interface between said cells; a transporting tube connected to the inlets and outlets of said cells;

a supporting screen held up on the supporting shelf positioned in each of said cells; and, an anion-exchange membrane supported by the said supporting screen wherein said extractor does not require the application of an electric potential across said membrane for its function.

* * * * *